United States Patent [19]  [11] Patent Number: 4,769,442
Iwasaki et al.  [45] Date of Patent: Sep. 6, 1988

[54] PROCESS FOR TREATING A POLYMER SLURRY

[75] Inventors: Takao Iwasaki; Tsuneo Okamoto, both of Iwaki, Japan

[73] Assignee: Kureha Kagaku Kogyo Kabushiki Kaisha, Tokyo, Japan

[21] Appl. No.: 77,008

[22] Filed: Jul. 21, 1987

Related U.S. Application Data

[63] Continuation of Ser. No. 859,799, May 5, 1986, abandoned.

[30] Foreign Application Priority Data

May 8, 1985 [JP] Japan ................................. 60-97513

[51] Int. Cl.$^4$ ............................................. C08G 75/14
[52] U.S. Cl. ..................................................... 528/388
[58] Field of Search ........................................ 528/388

[56] References Cited

U.S. PATENT DOCUMENTS

| | | |
|---|---|---|
| 3,562,199 | 2/1971 | Hill, Jr. et al. ........................ 528/388 |
| 4,025,496 | 5/1977 | Anderson et al. ..................... 528/388 |
| 4,331,801 | 5/1982 | Idel et al. ............................... 528/388 |
| 4,405,767 | 9/1983 | Beever et al. .......................... 528/388 |
| 4,415,729 | 11/1983 | Scoggins et al. ..................... 528/388 |
| 4,698,415 | 10/1987 | Sinclair et al. ........................ 528/388 |
| 4,728,723 | 3/1988 | Nakamura et al. ................... 528/388 |
| 4,730,034 | 3/1988 | Nesheiwat et al. ................... 528/388 |

FOREIGN PATENT DOCUMENTS

0104560 4/1984 European Pat. Off. .
0193951 10/1986 European Pat. Off. .

*Primary Examiner*—Melvyn I. Marquis
*Attorney, Agent, or Firm*—Wenderoth, Lind & Ponack

[57] ABSTRACT

A process for treating a polyarylene sulfide polymer slurry which has been provided by reactions of an alkali sulfide and a dichloroaromatic compound in N-methylpyrrolidone, the process comprising the following steps of (i) through (iv): (i) a step of separating a polymer slurry which contains polyarylene sulfide particles, alkali chloride as a by-product in the form of crystals and a solution and an arylene sulfide oligomer and has a liquid component which is principally N-methylpyrrolidone into polyarylene sulfide particles and a slurry containing the crystalline alkali chloride, the oligomer, and unreacted organic material by screening the slurry without diluting with water; (ii) a step of subjecting the slurry containing the crystalline alkali chloride to solid-liquid separation to obtain the crystalline alkali chloride; (iii) a step of washing the polyarylene sulfide particles with an organic solvent and water; and (iv) a step of recovering the organic solvent from a filtrate obtained by solid-liquid separation.

5 Claims, 1 Drawing Sheet

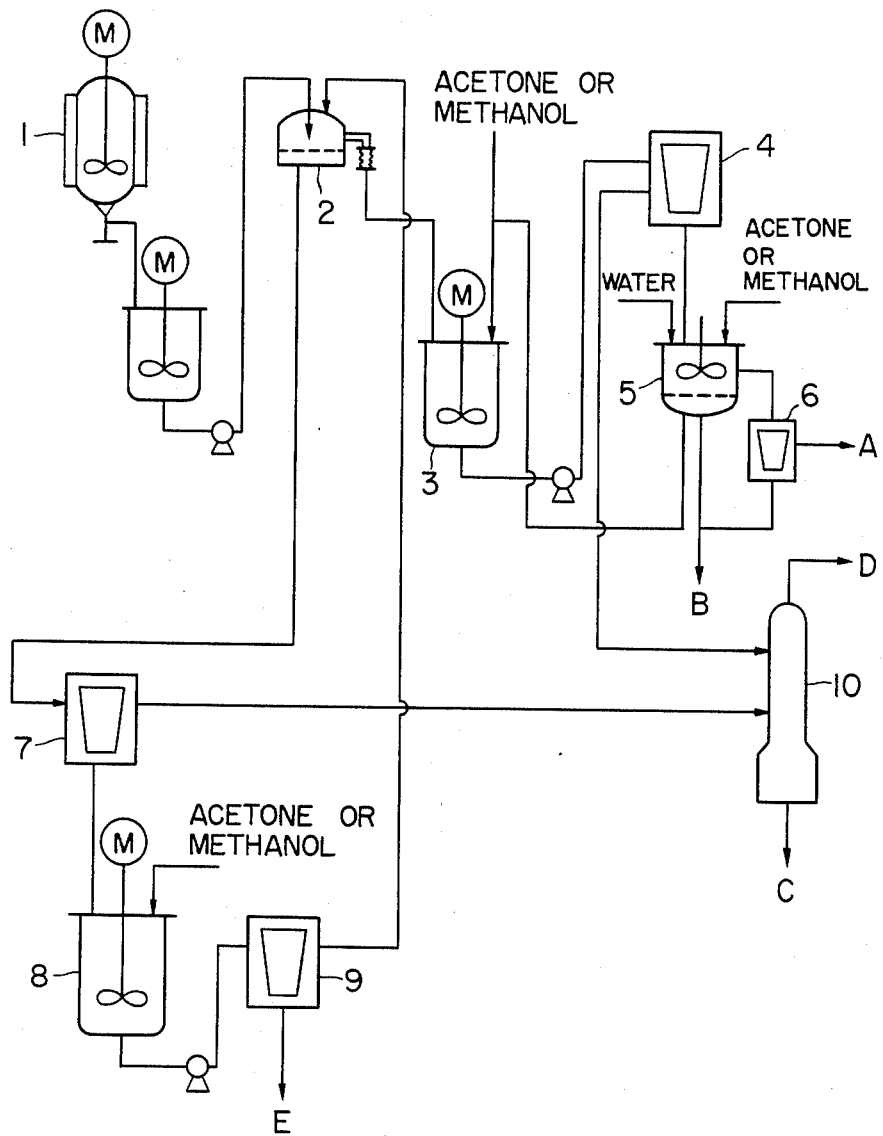

PROCESS FOR TREATING A POLYMER SLURRY

This application is a continuation of application Ser. No. 859,799, filed May 5, 1986 (now abandoned).

BACKGROUND OF THE INVENTION

1. Technical Field

This invention relates to a process for obtaining a polyarylene sulfide (referred to hereinafter as PAS) in the form of particles. More particularly, this invention relates to a process for treating a polymer slurry in order to prepare a particulate PAS in the form of a slurry containing in addition a crystalline alkali chloride by reacting an alkyl sulfide with a dichloroaromatic compound in a medium of water and N-methylpyrrolidone (referred to hereinafter as NMP), characterized in that the PAS, the chrystalline alkali chloride as a by-product and NMP are recovered in good yields.

2. Prior Art

Hitherto, there have been proposed many methods for producing PAS, among which methods a typical one involves the reaction of dichlorobenzene and an alkali sulfide in a polar solvent. There have also been reported many proposals with reference to specific reaction conditions and the like therefor.

However, none of these proposals have been successful in isolating the resulting PAS from the medium containing an arylene sulfide oligomer as a by-product of polymerization, and therefore the PAS has been conventionally recovered in the form of powder from the reaction mixtures by the solvent flashing method. Furthermore, the PAS in the form of powder brings about problems such as that when it becomes a product it is easily blown off as dust upon drying because it is a resin having a small particle size (fine powder) with a relatively low bulk density.

For the purpose of avoiding such problems, there have been developed recovering methods of PAS as a polymerization product to separate and recover the PAS more readily. One of such methods is disclosed, for example, in Unexamined Published Japanese Patent Application No. 1536/84. This method comprises polymerizing an alkali sulfide and a dihaloaromatic compound in NMP as a medium, then, for the purpose of separating PAS from the polymer slurry and recovering the medium NMP, adding first a large amount of water to the polymer slurry to dissolve therein most of soluble salts, then filtering PAS, and finally recovering NMP from the aqueous solution of NMP remaining after an arylene sulfide oligomer has been removed. However, the method uses water in a large amount during the separating of PAS, and thus it is not economical to recover NMP by the direct distillation of NMP containing a large amount of water. For this reason, a process for recovering NMP comprising once extracting it with an extracting agent such as n-hexanol and recovering it again by separating from the extracting agent is commonly used. Such a process makes the recovery of NMP complicated and brings about problems such as the treatment of waste water in a large amount.

SUMMARY OF THE INVENTION

An object of this invention is to improve the economical efficiency of the production of PAS by reducing the use of water or other solvents as far as possible and simplifying the procedure of separating PAS or an oligomer and recovering NMP as a solvent from a polymer slurry which is produced during the process of producing PAS by polymerization using NMP as a solvent.

The process for treating a polyarylene sulfide polymer slurry according to this invention which has been provided by reaction of an alkali sulfide and a dichloroaromatic compound in N-methylpyrrolidone, the process comprising the following steps of (i) through (iv):

(i) a step of separating a polymer slurry which contains polyarylene sulfide particles, alkali chloride as a by-product in the form of crystals and a solution and an arylene sulfide oligomer and has a liquid component which is principally N-methylpyrrolidone into polyarylene sulfide particles and a slurry containing the crystalline alkali chloride, the oligomer, and unreacted organic material by screening the slurry without diluting with water;

(ii) a step of subjecting the slurry containing the crystalline alkali chloride to solid-liquid separation to obtain the crystalline alkali chloride, (iii) a step of washing the polyarylene sulfide particles with an organic solvent and water, and (iv) a step of recovering the organic solvent from the liquid obtained by the solid-liquid separation.

According to a preferred embodiment of this invention screening with a sieve in step (i) of the polyarylene sulfide particles from the polymer slurry can be carried out while adding the liquid component obtained in the step (ii).

According to another preferred emobdiment of this invention, methanol or acetone can also be used as the organic solvent for washing the polyarylene sulfide particles.

According to a further preferred embodiment of this invention, water is added to the reaction mixture during the polymerization in order to produce the polymer slurry, the temperature then being raised to carry out the residual polymerization, and the mixture is cooled after polymerization to ensure that 90% or more of the precipitated polymer has a particle size of 100 $\mu$-5 mm and most of the aforementioned crystals have a particle size of 1–70$\mu$.

According to another embodiment of this invention, the sieve for screening and separating the polyarylene sulfide particles is set to have a mesh of 50–500$\mu$.

According to still another embodiment of this invention, the process comprises washing the polyarylene sulfide particles in a washing machine consisting of a stirring zone and a filtration zone with a filtering plate for dividing the zones therebetween, washing twice or more the polyarylene sulfide particles with a small amount of an organic solvent and water in the stirring zone provided with a stirrer to remove N-methylpyrrolidone, a polyarylene sulfide oligomer and an alkali chloride present within the pores of the polymer particles, and taking out the filtrate through the filtering plate from the stirring zone to remove it from the filtering zone.

According to this invention, the aforementioned problems in the prior art are solved.

In other words, the process for treating the polymer slurry according to this invention is generally applied to the treatment of the PAS particles having a larger particle size than that of the crystalline alkali chloride as a by-product. According to this invention, it is advantageous that the PAS particle is screened without dissolving the alakli chloride as a by-product. Moreover, the oligomer and unreacted organic materials which are dissolved in the solvent NMP can be separated from the polymer particles.

Separation of the PAS can be carried out without dissolving the crystalline alkali chloride, so that no water other than that required for the polymerization is introduced into the solvent NMP, which may be easily recovered and reused. Furthermore, NMP and the crystals of the deposited salt can be readily separated. A great saving in the energy required for recovering solvents by the distillation of the used NMP, methanol or acetone or by the extraction of NMP from the NMP/alkali chloride/arylene sulfide oligomer mixture with an organic solvent such as methanol, acetone or the like can be achieved in comparison with those of other known methods.

Furthermore, most of the alkali chloride contained in the filtered PAS polymer particles on completion of the polymerization have been removed during the previous step, so that the alkali chloride or the like can be readily removed by washing twice or more with the amount of water in the washing machine provided with a stirrer and a filtering plate for dividing the two zones therebetween.

BRIEF DESCRIPTION OF THE DRAWING

In the appended drawing the single FIGURE is a flowchart of an example of an apparatus which can be used for the process for treating the polymer slurry.

DETAILED DESCRIPTION OF THE INVENTION

Polymer Slurry

The PAS polymer slurry to which this invention is applied is the one that has such a large particle size that the PAS can be separated from a crystalline alkali chloride by screening with sieves. The PAS particles preferably have a particle size of 100 micron or more.

An example of the method of preparing a PAS having such a particle size is disclosed, for example, in the specification of Japanese Patent Application No. 126725/84, which we have previously filed. This method is the method of polymerizing an alkali sulfide and a dihaloaromatic compound in two steps in NMP as a solvent and comprises reacting the dihaloaromatic compound in a conversion of 50-98 mole % with the charged alkali sulfide in a solvent consisting of 0.2-5 liters of NMP and 0.5-2.4 moles of water per mole of the charged alkali at a temperature of 180°-235° C., adding water to ensure that water is present in an amount of 2.5-7.0 moles per mole of the charged alkali sulfide, and carrying out reaction at a temperature of 245°-290° C. to obtain PAS in the form of particles. According to this method, there is provided a polymer slurry containing almost no PAS having a particle size of less than 100$\mu$ and containing the alkali chloride as a by-product, most of which has been deposited as fine crystals of 1-70$\mu$.

The PAS polymer slurry obtained on completion of polymerization contains in addition to PAS, a crystalline alkali chloride, a dissolved alkali chloride, an arylene sulfide oligomer and an unreacted dihaloaromatic compound, so that it is not always easy to obtain PAS from the slurry by direct solid-liquid separation, but it is possible to separate the PAS particles and the crystalline alkali chloride as fine crystals by screening with sieves.

Treatment of the Slurry

It is possible to separate the PAS particles from the polymer slurry by screening with a screening apparatus having a mesh size of 50-500$\mu$, particularly preferably 70-200$\mu$, in which the PAS particles are retained on the screen and the crystalline alkali chloride is transferred to the liquid phase. For the purpose of carrying out the screening more readily, the screening according to this invention can be carried out while the liquid produced in the later steps is added.

In the PAS particles separated by screening is still contained NMP in which the arylene sulfide oligomer and the alkali chloride are dissolved, and thus the solvent is removed by washing. The washing is first of all carried out with an organic solvent and then with water. As the organic solvent for washing in this case, a solvent which does not affect PAS and has compatibility with water is used. It is preferable that a solvent dissolves the alkali chloride only slightly and has a low latent heat in evaporation. Preferred solvents are acetone and methanol. The organic solvent used for the washing of PAS can be used repeatedly by recovering it by distillation, part or all of which can be used as a liquid poured on the polymer slurry in the separation of the PAS particles therefrom.

The arylene sulfide oligomer and NMP are removed from the PAS particles thus separated, and the alkali chloride is also removed by washing with water. Still small amount of substances are remain in the fine pores of the particles, so that it is desirable to carry out, not washing once with a large amount of a solvent, but washing repeatedly with a small amount of a solvent to contact with a fresh solvent and to pass the solvent through the aforementioned pores compulsorily.

Therefore, it is preferred to use a batch-wise system to repeat washing and extraction of liquid in a washing machine. In order to carry out washing more efficiently, it is possible to use an ultrasonic apparatus to promote washing. As a washing machine to carry out such washing, a washing machine comprising a stirring zone and a filtering zone with a filtering plate provided for dividing the two zones therebetween can be used. The washing process comprises washing twice or more the polyarylene sulfide particles with a small amount of an organic solvent and water in the stirring zone provided with a stirrer to remove N-methylpyrrolidone, a polyarylene sulfide oligomer and an alkali chloride which are present in the pores of the polymer particles, and taking out the filtrate through the filtering plate from the stirring zone to remove it from the filtering zone. The PAS particles do not pass through the filtering plate, and liquid extraction is carried out under reduced pressure, pressurized condition or atmospheric condition.

On the other hand, the slurry which is obtained by separating the PAS particles from the polymer slurry and thus contains the crystalline alkali chloride is first subjected to centrifugal separation method or the like to separate the crystalline alkali chloride. The filtrate is then subjected to distillation to recover NMP for reuse. Part of the filtrate prior to distillation can be used as a pouring liquid on the separation by screening.

An organic solvent such as methanol separated from a later step which will be described is used as a pouring liquid in the separation of PAS.

The PAS particles washed with an organic solvent such as methanol and the like and further washed with water is dried to obtain a product.

As described above, it is possible to obtain efficiently and inexpensively with a simple process a product which does not contain NMP, an oligomer, an unreacted dihaloaromatic compound or an alkali chloride.

This invention will now be described more specifically with reference to the appended drawing. An alkali sulfide and a dichloroaromatic compound dissolved in N-methylpyrrolidone are polymerized in a polymerization vessel to prepare a polymer slurry. The polymer slurry contains polyarylene sulfide particles, crystalline and dissolved alkali chlorides and an arylene sulfide oligomer and comprises N-methylpyrrolidone as a main liquid component. The polymer slurry is separated into the polyarylene sulfide particles and a slurry containing the crystalline alkali chloride, the oligomer and an unreacted organic material by screening with a polymer slurry separator 2. The polyarylene sulfide particles thus separated are first washed with an organic solvent (acetone or methanol) in a washing vessel 3 to separate the polyarylene sulfide particles from filtrate. The polyarylene sulfide particles are further washed with water and acetone (or methanol) in a washing machine 5. The washed polyarylene sulfide particles are dehydrated in a separator 6 to obtain a product A.

The filtrate B is taken out from the other outlet of the washing machine 5.

The slurry which is separated in the polymer slurry separator 2 and contains the crystalline alkali chloride is subjected to solid-liquid separation in a separator 7.

The crystalline alkali chloride thus separated is then washed with acetone or methanol in a washing vessel 8 and the crystalline alkali chloride E is discarded through a separator 9, and the separated acetone or methanol is preferably recycled to the separator 2.

The organic solvent (acetone or methanol) recovered from the liquid after solid-liquid separation is put into a column 10 and then purified for re-use (D), also C is discharged from the bottom of the column 10 and then discarded.

What is claimed is:

1. A process for treating a polyarylenesulfide slurry obtained by the reaction of an alkali metal sulfide with a dichloroaromatic compound in N-methylpyrrolidone and water with simultaneous formation of an alkali metal chloride and which slurry contains the polyarylenesulfide and a portion of the alkali metal chloride in the form of particles dispersed in the slurry, which process comprises:
   (i) obtaining the slurry in a form such that 90% or more of the polyarylenesulfide particles have a particle size of from 100 microns to 5 mm and the majority of the alkali metal chloride particles have a particle size of from 1 to 70 microns;
   (ii) subjecting the said slurry, without diluting same with water, to screening by means of a screen having a mesh size of from 50 to 500 microns whereby the polyphenylenesulfide particles are retained on the screen while the alkali metal chloride particles together with the liquid phase of the slurry are passed through the screen;
   (iii) washing the polyarylenesulfide particles obtained with an organic solvent and with water;
   (iv) subjecting the liquid phase obtained in step (ii) which contain the alkali metal chloride particles dispersed therein to separation thereby to separate the alkali metal chloride particles from the remainder of the liquid phase; and
   (v) recovering by means of distillation the N-methylpyrrolidone from the liquid phase obtained in step (iv).

2. A process for treating a polyarylenesulfide slurry as claimed in claim 1 in which the slurry for step (i) is obtained by the steps of:
   (a) reacting an alkali metal sulfide with a dichloroaromatic compound in the presence of 0.2 to 5 liters of N-methylpyrrolidone and 0.5 to 2.4 moles of water both per 1 mole of the alkali metal sulfide until the conversion of the dichloroaromatic compound reaches 50 to 98 mole percent;
   (b) adding water to the reaction mixture so that the total quantity of water in the reaction mixture is 2.5 to 7.0 moles per mole of the alkali metal sulfide;
   (c) heating the reaction mixture at a temperature of 245° to 290° C. to improve the conversion; and
   (d) cooling the reaction mixture.

3. A process for treating a polyarylenesulfide slurry as claimed in claim 1 in which the alkali metal chloride particles obtained in the step (iv) is washed with acetone or methanol and the step (ii) is carried out while the acetone or methanol used in the washing is poured onto the slurry undergoing screening.

4. A process for treating a polyarylenesulfide slurry as claimed in claim 1 in which the organic solvent used in step (iii) is methanol or acetone.

5. A process for treating a polyarylenesulfide slurry as claimed in claim 1 in which step (iii) is carried out in an apparatus which has a stirring zone provided with a stirrer and a filtering zone under the stirring zone with a filtering plate between the two zones, in which apparatus the polyarylenesulfide particles are washed at least twice with an organic solvent and water.

* * * * *